(12) United States Patent
Williamson et al.

(10) Patent No.: US 7,303,736 B2
(45) Date of Patent: Dec. 4, 2007

(54) NANOSTRUCTURED MATERIALS FOR HYDROGEN STORAGE

(75) Inventors: Andrew J. Williamson, Pleasanton, CA (US); Fernando A. Reboredo, Pleasanton, CA (US)

(73) Assignee: The Regents of the University of California, Oakland, CA (US)

( * ) Notice: Subject to any disclaimer, the term of this patent is extended or adjusted under 35 U.S.C. 154(b) by 317 days.

(21) Appl. No.: 11/081,489

(22) Filed: Mar. 15, 2005

(65) Prior Publication Data

US 2005/0208376 A1 Sep. 22, 2005

Related U.S. Application Data

(60) Provisional application No. 60/554,034, filed on Mar. 16, 2004.

(51) Int. Cl.
*B01J 20/10* (2006.01)

(52) U.S. Cl. .................. 423/324; 96/108; 502/526; 977/813; 977/962

(58) Field of Classification Search ............... 423/324, 423/345, 439, 648.1; 96/108; 95/90; 502/526; 206/0.7; 977/773, 776, 813, 962; 429/218.2
See application file for complete search history.

(56) References Cited

U.S. PATENT DOCUMENTS

| | | | | |
|---|---|---|---|---|
| 4,431,562 | A * | 2/1984 | Hiraki et al. | 252/188.25 |
| 5,653,951 | A * | 8/1997 | Rodriguez et al. | 423/439 |
| 7,115,244 | B2 * | 10/2006 | Zhao et al. | 423/648.1 |
| 2001/0016283 | A1 | 8/2001 | Shiraishi et al. | |
| 2002/0179564 | A1 | 12/2002 | Geobegan et al. | |
| 2003/0167778 | A1 | 9/2003 | Bradley et al. | |
| 2004/0209144 | A1 * | 10/2004 | Kornilovich | 429/34 |
| 2007/0014683 | A1 * | 1/2007 | Zhao et al. | 420/400 |

FOREIGN PATENT DOCUMENTS

| WO | WO 03/050036 A1 | 6/2003 |
|---|---|---|
| WO | WO 03/070662 A1 | 8/2003 |

* cited by examiner

*Primary Examiner*—Frank M. Lawrence
(74) *Attorney, Agent, or Firm*—Eddie E. Scott; John H. Lee

(57) ABSTRACT

A system for hydrogen storage comprising a porous nano-structured material with hydrogen absorbed on the surfaces of the porous nano-structured material. The system of hydrogen storage comprises absorbing hydrogen on the surfaces of a porous nano-structured semiconductor material.

16 Claims, 7 Drawing Sheets

IL 11253

IL 11253

IL 11253

IL 11253

IL 11253

IL 11253

C5Si24 particles

IL 11253

C5Si24 particles

NANOSTRUCTURED MATERIALS FOR HYDROGEN STORAGE

CROSS-REFERENCE TO RELATED APPLICATIONS

This application claims the benefit of U.S. Provisional Patent Application No. 60/554,034, filed Mar. 16, 2004 and titled "Nanostructured Materials for Hydrogen Storage." U.S. Provisional Patent Application No. 60/554,034, filed Mar. 16, 2004, titled "Nanostructured Materials for Hydrogen Storage" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to nanostructured materials and more particularly to nanostructured materials for hydrogen storage.

2. State of Technology

U.S. Patent Application No. 2001/0016283 by Masashi Shiraishi et al for a carbonaceous material for hydrogen storage, production method thereof, and electrochemical device and fuel cell using the same, published Aug. 23, 2001, provides the following state of technology information, "In recent years, a recognition has been promptly spread that hydrogen is an ideal clean, inexhaustible energy source because it has a large chemical energy amount per unit mass and does not release toxic substances and earth warming gases upon use of hydrogen as fuel. In particular, fuel cells capable of converting a hydrogen energy into an electric energy has been actively developed. Such fuel cells are expected to be used, typically, as thermal sources for large-scale power generation and on-site private power generation, and as power sources for electric cars. The use of hydrogen as fuel, however, presents the following problems: namely, (1) since hydrogen is in a gaseous state at standard temperature and pressure, it is relatively difficult to handle as compared with coal or petroleum; (2) since the density of hydrogen is much smaller than that of coal or petroleum, the chemical energy per unit volume thereof becomes smaller (that is, the volume per unit chemical energy thereof becomes larger), to cause a problem with storage and transportation thereof; and (3) since hydrogen has possibilities of leakage and explosion, it is difficult to keep safety upon use of hydrogen as fuel. For utilization of hydrogen as fuel, therefore, it becomes a key-point how to store a large amount of hydrogen in a state transportable with safety, and studies have been made to establish a new practical hydrogen storage technology."

U.S. Patent Application No. 20030167778 by Keith Bradley et al for hydrogen storage in nanostructures with physisorption published Sep. 11, 2003, provides the following state of technology information, "Hydrogen storage is the key unsolved problem of producing fuel cells for hydrogen-powered automobiles or portable energy devices. In particular, storing hydrogen in large quantities safely and in a light container has proved prohibitively difficult so far."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for hydrogen storage. The system comprises a porous nano-structured material with hydrogen absorbed on the surfaces of the porous nano-structured material. The system of hydrogen storage comprises absorbing hydrogen on the surfaces of a porous nano-structured semiconductor material. The system is predicted to store between 1.6 and 3.2 weight % hydrogen, at STP. Adjusting the temperature from below to above the operating temperature of approximately 340-350K switches the material from storing to emitting hydrogen. The present invention has uses in vehicular applications. In addition to vehicular applications, another application of the present invention is in portable consumer electronic devices. In these devices the benchmark for energy storage is Lithium ion batteries. Hydrogen stored in Applicants' nano-material and combined with oxygen in a PEM fuel cell has an energy density of 4.3 MJ kg-1. This is approximately an order of magnitude higher than Li batteries (0.5 MJ kg-1), while the two media have similar weights and volumes.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
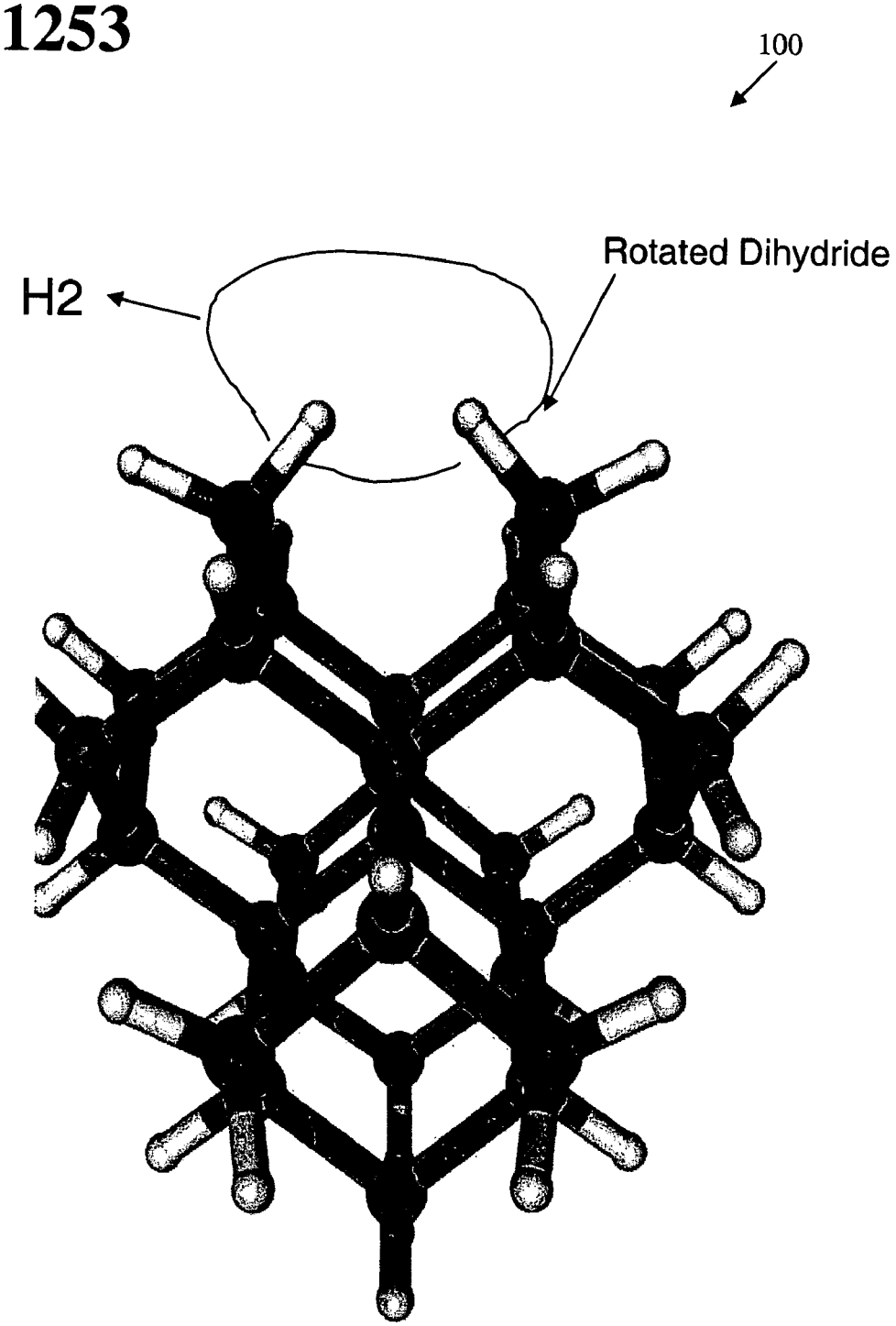
FIG. 1 shows a hybrid nanoparticle ($Si_{29}H_{36}$) of one embodiment of a system for reversible storage of hydrogen.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Recent advances in proton exchange membrane (PEM) fuel cell technologies have renewed interest in using hydrogen as a fuel. Hydrogen is attractive as it can be produced from renewable energy sources and burnt in a PEM fuel cell without producing pollution. Currently, one of the key enabling technologies required to make the shift towards using hydrogen as a fuel is a secure, compact, lightweight and economic method of storing hydrogen. Conventional approaches to hydrogen storage have focused on either physical storage of compressed hydrogen or storage in reversible metal hydrides and alanates.

It is estimated that 5 kg of hydrogen would be required to power a fuel cell vehicle for 400 miles. At STP this hydrogen occupies 56,000 liters, and therefore storage of hydrogen gas in a reasonable volume requires pressures exceeding 10,000 psi. Alternatively, storing hydrogen in metal hydrides or alanates reduces the storage volume but the presence of heavy metallic elements significantly increases the weight. Recently, the possibility of storing hydrogen in carbon nanotubes (CNT) has generated considerable excitement. CNTs are light and safe and their cost is dropping rapidly. However, it is currently unclear whether CNTs are actually able to store significant amounts of hydrogen. Measurements have proved difficult to reproduce due to contamination with Ti-alloys introduced during the sonication process used to open the nanotubes for storage, and calculations have not reached consensus on the strength of hydrogen to nanotube bond.

Referring now to FIG. 1, a hybrid nanoparticle ($Si_{29}H_{36}$) of one embodiment of a system for reversible storage of hydrogen is illustrated. The nanoparticle is designated generally by the reference numeral 100. The structure of the 1 nm particle 100, consisting of 29 Si atoms, with (100) facets containing SiH2 dihydride groups and reconstructed SiH dimer groups. This particle contains 12 SiH2 groups and upon reconstruction the H content is reduced from Si29H36 to Si29H24. The surface to volume ratio of the nanoparticle 100 increases as its size decreases, therefore maximum hydrogen storage for a given weight and volume will be achieved for the smallest nanoparticles. The system 100 has uses for the reversible storage of hydrogen at room temperature and pressure. This can be a vital component of hydrogen powered fuel cell systems.

The amount of hydrogen that needs to be stored depends on the eventual fuel cell application and can vary from a few grams for fuel cells used to power portable electronics to an estimated 5 kg of hydrogen required to power a fuel cell vehicle for 400 miles. At standard temperature and pressure 5 kg of hydrogen would occupy 56,000 liters. Therefore, storing this amount of hydrogen gas in a similar volume to conventional gasoline fuel tanks requires storage at pressures exceeding 10,000 PSI. Current attempts to store hydrogen by absorbing it in metal hydrides or alanates reduce the storage volume to a feasible size, but the presence of heavy metallic elements significantly increases the weight. Recently, the possibility of storing hydrogen in carbon nanotubes (CNT) has generated considerable excitement. CNTs are light and safe and their cost is dropping rapidly. However, the latest experiments suggest it is unlikely that CNT are actually able to store significant amounts of hydrogen.

The system 100 provides a nanostructured, semiconductor material, designed by computer simulation for hydrogen storage. First principles computer simulations are used to create a porous, nano-structured semiconductor material that will reversibly store hydrogen for fuel cell applications. The first set of computer simulations were performed to design nanoparticle building blocks which were optimized to absorb a maximal amount of hydrogen on their surfaces, while minimizing total weight and volume. Additional computer simulations were then used to select which building blocks can be assembled into a macroscopic solid for hydrogen storage. The resulting material will store between 1.6 and 3.2 weight % hydrogen, at room temperature and pressure. This amount of hydrogen storage is competitive with current state-of-the-art, metal hydride storage materials and, in addition, this new material contains only carbon and silicon, reducing both its cost and environmental impact.

Figure 2:
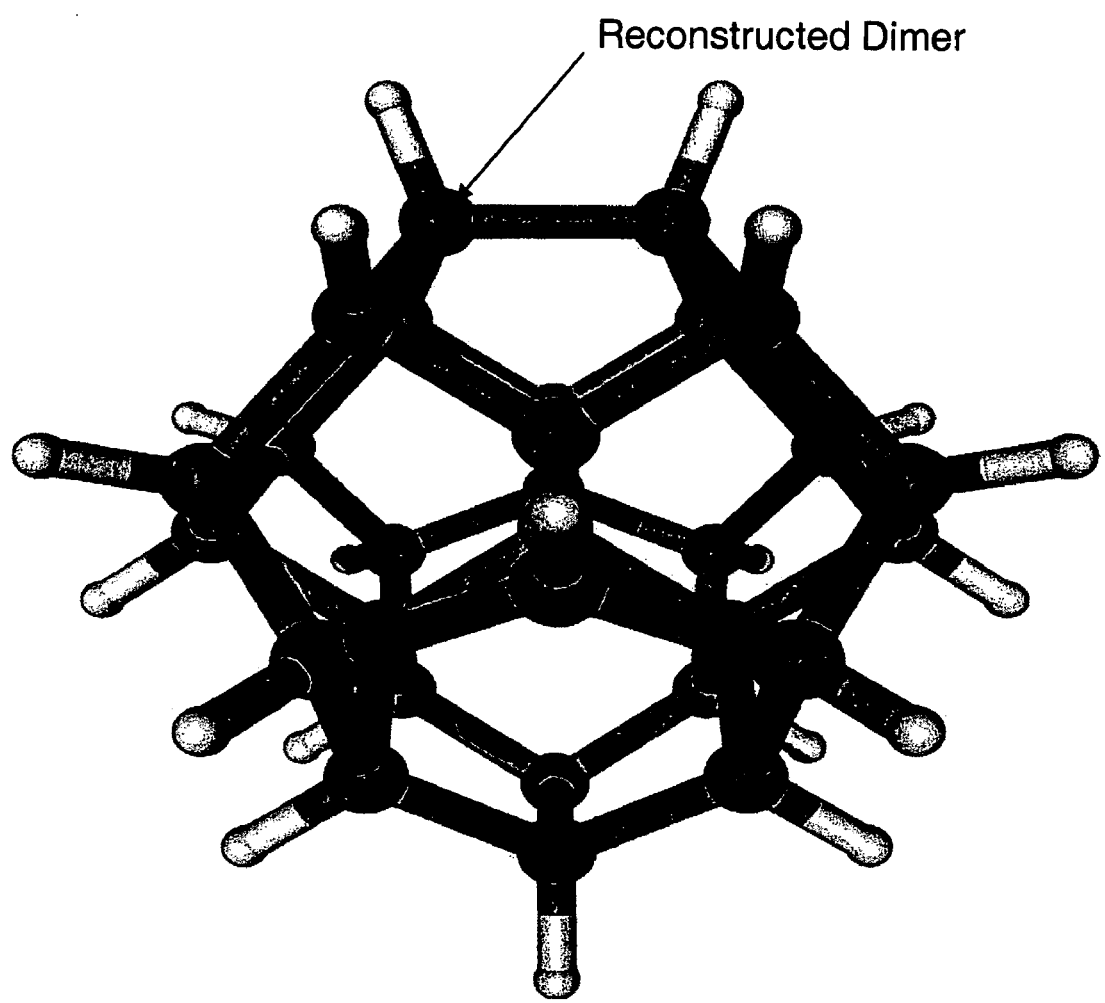
FIG. 2 shows a hybrid nanoparticle ($Si_{29}H_{24}$) of another embodiment of a system for reversible storage of hydrogen.

Referring now to FIG. 2, a nanoparticle ($Si_{29}H_{24}$) of another embodiment of the present invention is shown wherein computer simulations were used to design a material for hydrogen storage in which hydrogen is absorbed on the surfaces of a porous, nanostructured silicon carbide material. The nanoparticle is designated generally by the reference numeral 200. The first set of computer simulations were used to design nanoparticle building blocks which were optimized to absorb a maximal amount of hydrogen on their surface, while minimizing their total weight and volume. Additional computer simulations were then used to select which building blocks can be assembled into a macroscopic solid for hydrogen storage applications.

The material was designed so that by adjusting the temperature from below to above an operating temperature of 340K the material switches from storing to emitting hydrogen. Unlike existing metal hydride storage materials, the core structure of this new material is unaltered when cycling from full hydrogen storage to fully deplete of hydrogen, removing engineering complications associated with expansion and contraction. The final material is predicted to store between 1.6 and 3.2 weight % hydrogen, at room temperature and pressure, which represents an improvement over current state-of-the-art, metal hydride storage materials. In addition, this new material contains only carbon and silicon atoms and it is therefore more economical and environmentally benign than current solutions.

The system for creating nanoparticle 200 provides an alternative material for hydrogen storage in which hydrogen is absorbed on the surfaces of a purpose built, porous, nano-structured, semiconductor material. Simulations based on electronic structure calculations have recently predicted new materials in which the atomic structures have been designed to produce desired lattice constants and optical properties. Here Applicants adopt similar techniques to first design a nanoparticle building block that will reversibly absorb a maximal amount of hydrogen, while minimizing its total weight and volume. Applicants then perform additional simulations to predict how these nanoparticles would assemble into a macroscopic solid, while maintaining their hydrogen storage capabilities. The resulting material is predicted to store between 1.6 and 3.2 weight % hydrogen, at STP. Adjusting the temperature from below to above the operating temperature of approximately 340-350K switches the material from storing to emitting hydrogen. Unlike metal hydrides, the core skeleton structure of this material is unaltered when cycling from full hydrogen storage to fully depleted of hydrogen, removing engineering complications associated with expansion/contraction.

To reversibly absorb/desorb hydrogen molecules on a surface, e.g., a CNT, requires the formation/breaking of a bond between H2 and the surface. The strength of this bond must be finely balanced between being strong enough to robustly store hydrogen, but weak enough to break when emission of hydrogen is required. This requires a fine tuning that is difficult to achieve, particularly for a non-polar molecule such as hydrogen.

Applicant's alternative approach is to control hydrogen storage via stronger covalent bonds between hydrogen atoms and semiconductor surface atoms. The energy of these bonds depends on the details of the atomic configuration at the surface it and can be changed to favor either absorption or desorption of hydrogen. For example, in the case of silicon surface reconstructions, in a high μH environment, (100) facets consist of covalently bonded SiH2 groups. When μH is reduced, the surface undergoes a reversible (2×1) reconstruction in which H atoms from neighboring SiH2 groups detach from the surface as H2 molecules and additional Si—Si dimer bonds form.

Early studies of hydrogen terminated bulk silicon surfaces suggest that these surfaces would not be suitable for room temperature hydrogen absorption as the unreconstructed (high H content) surface is only metastable and therefore hydrogen storage in Si—H2 groups would require significant cooling. However, Applicants have recently shown that on a nanoparticle surface, the high degree of curvature dramatically reduces the repulsion between H atoms in neighboring XH2 groups compared to bulk surfaces. On a flat silicon surface the large number of dihydride Si—H2 groups form a "canted" structure to minimize the repulsion between neighboring H atoms. On a nanoparticle surface, where the (001) facets are small, neighboring dihydrides instead avoid each other by rotating in opposite directions, increasing the H—H separation.

Designing Clusters For Hydrogen Storage—Here Applicants perform a series of simulations to design a hybrid carbon-silicon nanoparticle where the transition from Si—H2 to Si—H surface groups can be used to reversibly store hydrogen. To quantify the relative stabilities of XH and XH2 surface groups (X=C,Si,Ge), a series of total energy calculations, based on density functional theory, were performed to determine the lowest energy structures of a series of semiconductor nanoparticles. The formation energies, Ω, of the structures with dihydride and dimerized surfaces are given by $$\Omega = E_{tot} + EZPE - n_X \mu_X - n_H \mu_H, \quad (1)$$

where Etot is the total energy, EZPE is the zero-point XH vibrational energy, nX is the number of X atoms, and μX is the chemical potential of material X.

The surface to volume ratio of a nanoparticle increases as its size decreases, therefore maximum hydrogen storage for a given weight and volume will be achieved for the smallest nanoparticles. A prototype for the smallest nanoparticle with (100)-type facets has previously been proposed as the structure of silicon nanoparticles synthesized by sonification of porous silicon.

Figure 3:
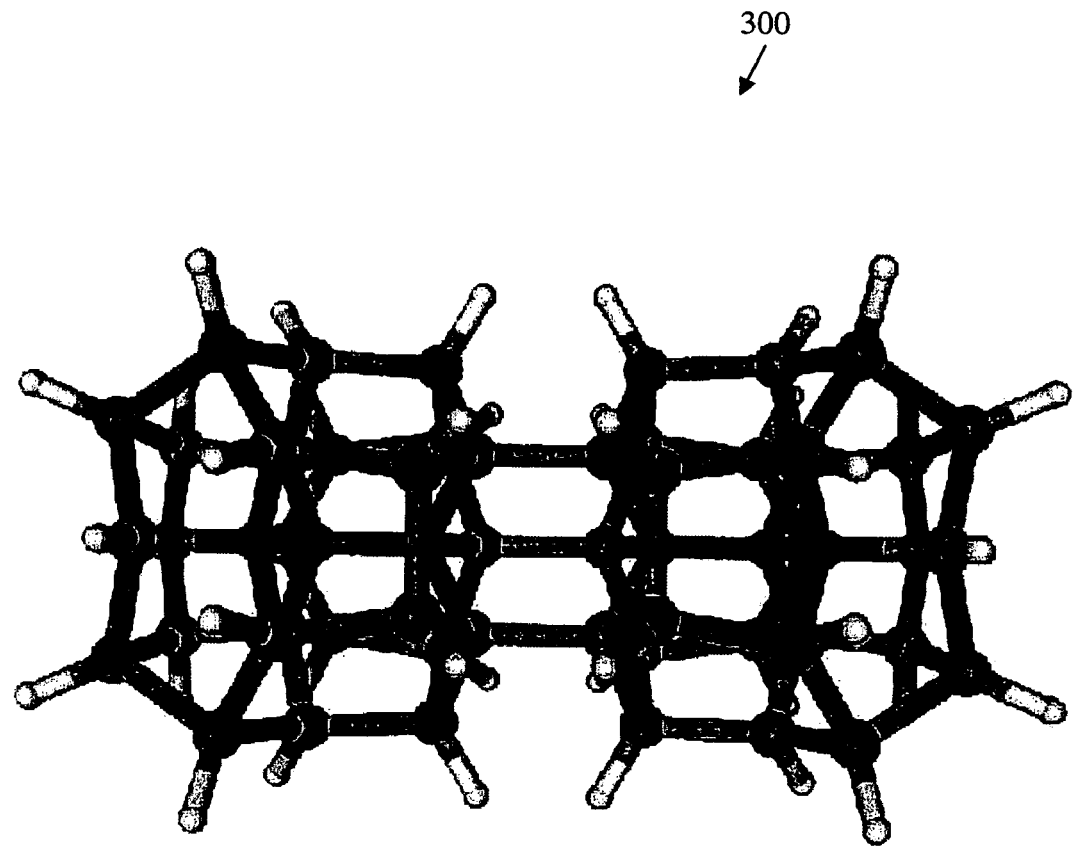
FIG. 3 shows a nanoparticle ($C_{10}Si_{48}H_{42}$) joined by 111 facets of another embodiment of a system for reversible storage of hydrogen.

Referring now to FIG. 3, a nanoparticle ($C_{10}Si_{48}H_{42}$—joined by 111 facets) of another embodiment of the present invention is shown. The nanoparticle is designated generally by the reference numeral 300 in FIG. 3.

Figure 4:
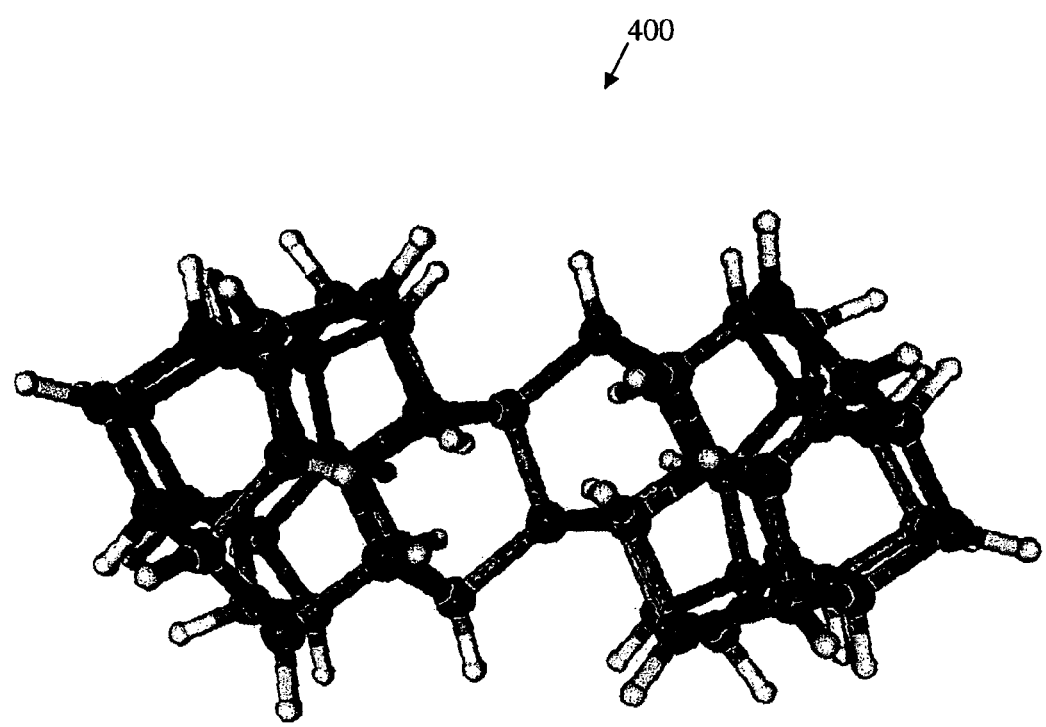
FIG. 4 shows a nanoparticle ($C_{10}Si_{48}H_{46}$) joined by 100 facets of another embodiment of a system for reversible storage of hydrogen.

Referring now to FIG. 4, a nanoparticle ($C_{10}Si_{48}H_{46}$) joined by 100 facets of another embodiment of the present invention is shown. The nanoparticle is designated generally by the reference numeral 400 in FIG. 4.

Figure 5:
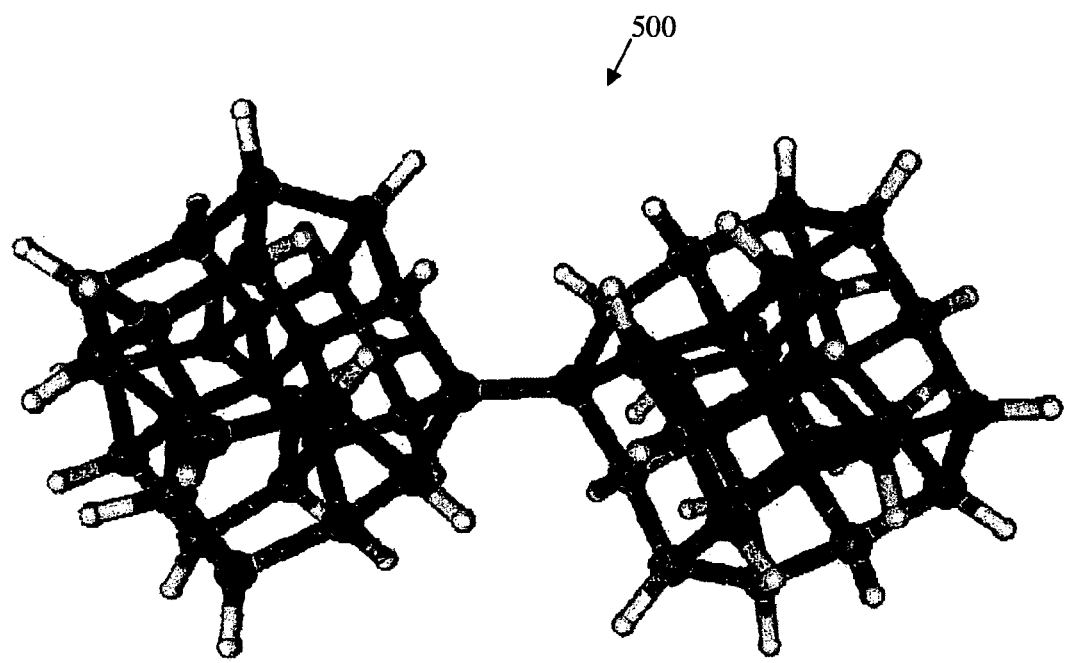
FIG. 5 shows a nanoparticle ($C_{10}Si_{48}H_{46}$) joined by a single bond of another embodiment of a system for reversible storage of hydrogen.

Referring now to FIG. 5, a nanoparticle ($C_{10}Si_{48}H_{46}$) joined by a single bond of another embodiment of the present invention is shown. The nanoparticle is designated generally by the reference numeral 500 in FIG. 5.

Figure 6:
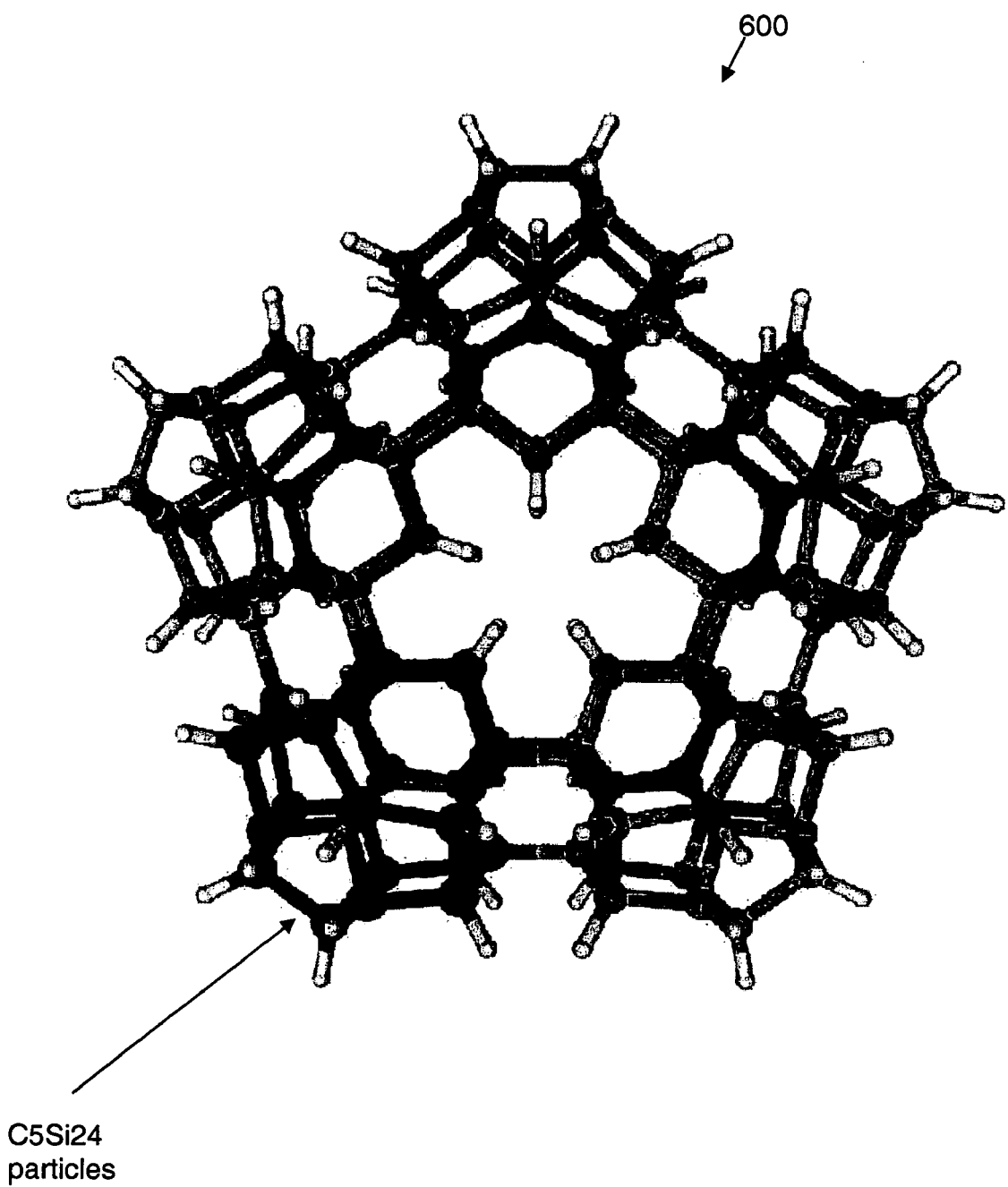
FIG. 6 shows a nanoparticle ($C_{25}Si_{120}H_{90}$) of another embodiment of a system for reversible storage of hydrogen.

Referring now to FIG. 6, a nanoparticle ($C_{25}Si_{120}H_{90}$) of another embodiment of the present invention is shown. The nanoparticle is designated generally by the reference numeral 600 in FIG. 6.

Figure 7:
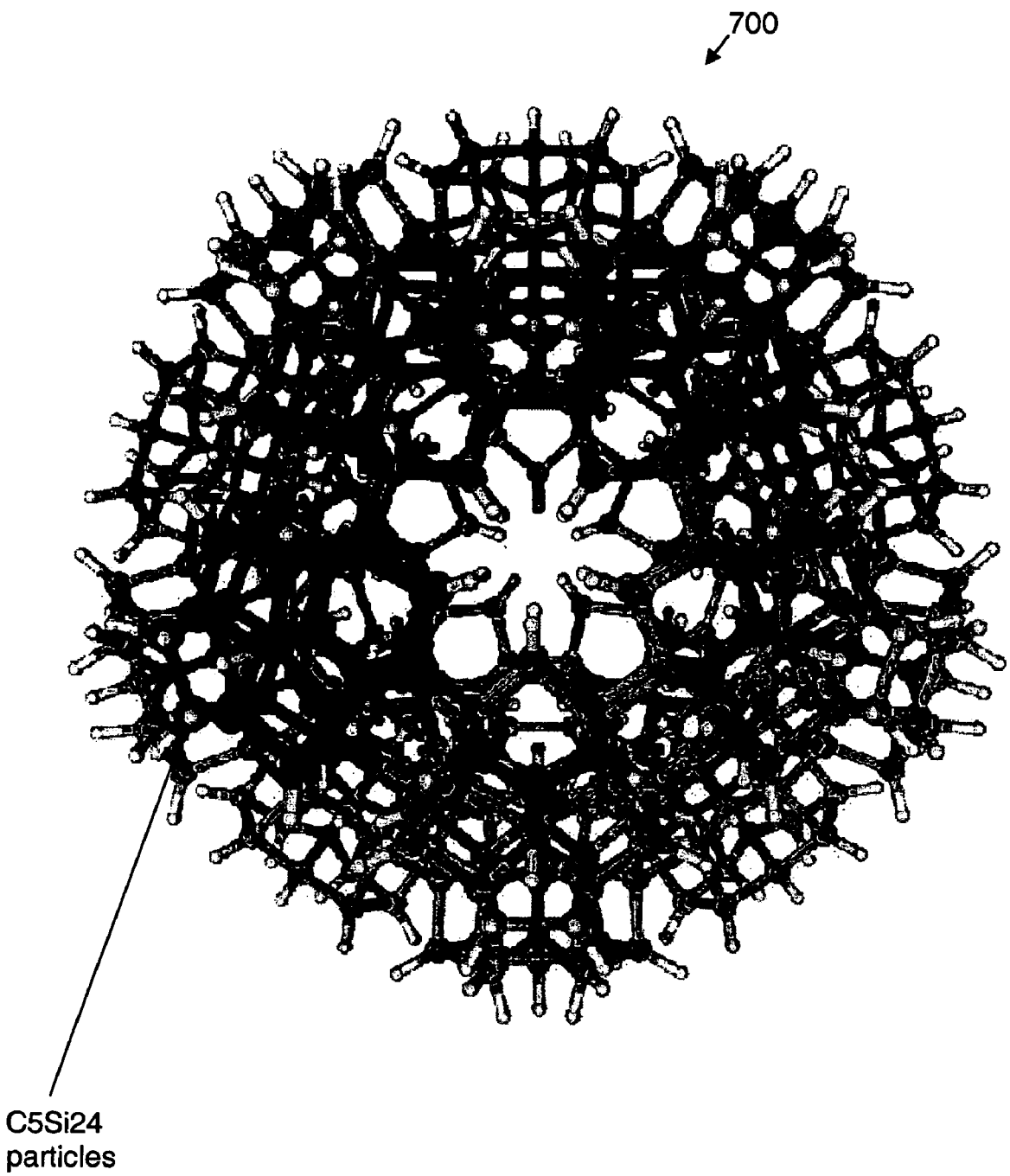
FIG. 7 shows a nanoparticle ($C_{100}Si_{430}H_{300}$) of another embodiment of a system for reversible storage of hydrogen.

Referring now to FIG. 7, a nanoparticle ($C_{100}Si_{430}H_{300}$) of another embodiment of the present invention is shown. The nanoparticle is designated generally by the reference numeral 700 in FIG. 7.

Applicant's have calculated temperature dependence of the chemical potential of hydrogen atoms in an H2 molecule, μH(T) (including in μH the zero point energy difference between H—H and Si—H bonds and the vibrational and rotational entropy of H2). The value of μC H for the Si29H36→Si29H24reconstruction was plotted. The intersection between this line and the μH(T) curve indicates that μC H corresponds to a critical temperature T C of approximately 580K. Temperatures lower than this intersection point will favor dihydride structures and higher temperatures will favor dimer structures. While bulk silicon surfaces favor SiH dimers too strongly to reversibly store hydrogen at room temperature (T C<300K), the reduced SiH2 repulsion on silicon nanoparticle surfaces favors surface SiH2 dihydrides too strongly (T C=580K).

An absorption/desorption switching temperature of 580 K is too high to be compatible with PEM fuel cells which require operating temperatures below 400 K. Applicants therefore next explore how T C varies with the choice of nanoparticle material. The requirement to minimize the weight of the storage material suggests choosing elements from the first 3 rows. While carbon is light, CH bonds are rather strong and high temperatures are required to form surface dimers. Switching from a Si to Ge nanoparticle one expects the longer Ge—H bond to increase the repulsion between H atoms on neighboring GeH2 groups, thus favoring the formation of surface dimers more strongly than in the case of Si and therefore reducing T C. Applicants calculated value of μC H for Ge29H36→Ge29H36 is indeed slightly higher than for Si nanoparticles, corresponding to a T C of 520 K. However, the 160% increase in weight incurred by switching from Ge to Si is a high price to pay for a 60 K reduction in operating temperature.

An alternative approach to designing structures with lower T C is to favor the formation of surface dimmers by altering the material in the core of the nanoparticle. Replacing silicon atoms with carbon in the core produces three high symmetry clusters; SiC4Si24, C5Si24 and SiC16Si12. In C5 Si24 the five center silicon atoms are replaced with carbon, while in SiC4Si24 the center remains silicon, but its four neighbors are replaced with carbon. The SiC16Si12 particle represents a piece of the SiC cubic lattice.

The C—C bond lengths in the core of these clusters are stretched by the surrounding silicon shell to 1.69° A. This is longer than the 1.54° A diamond bond length, but still considerably shorter than the 2.3° A Si—Si bond lengths. The smaller carbon cores pull in the Si atoms from the surface of the nanoparticle, reducing the separation between Si atoms on neighboring SiH2 groups from 4.1 to 3.7° A.

Applicants' calculations show that this reduced separation increases the repulsion between neighboring dihydrides, favoring reconstructions to the dimer structure, such that T C for all three of these silicon/carbon clusters has an ideal value of 340 K. Therefore, individual silicon clusters with carbon cores are promising materials for storing H2. Each cluster can reversibly store 6H2 molecules, yielding a maximum density of 20 kg m–3 of H2.

Assembling Clusters into a Solid—While a densely packed collection of individual C5 Si24 nanoparticles would function efficiently as a hydrogen storage material, in many cases it would be desirable to assemble the particles into a macroscopic solid. In the following sectiori Applicants discuss how to select those nanoparticles which will "self-assemble" into such a macroscopic solid, while maintaining their hydrogen storage properties.

Examination of the structure of X29 particles (X=C,Si, Ge) shows that they contain 4 (111)-type facets representing the faces of a tetrahedron and 6 pairs of dihydrides/dimers on (100)-type facets, each pair making up an edge of the tetrahedron. To assemble these particles into a close packed array via the formation of new XX bonds, Applicants consider three limiting cases; (i) connecting the (111) facets face-to-face, (ii) connecting the edges of the tetrahedra via the (100) dihydrides/dimers, or (iii) connecting the clusters via a single bond on the (100) facet.

To maintain the H2 storage properties of the particles Applicants select those clusters which maintain the exposed (100) facets on which H2 can be stored after being assembled into a three dimensional array. In the structure formed by connecting (111) facets (FIG. 3) none of the (100) SiH2/SiH groups are involved in the connections between the nanoclusters. It is therefore still possible to store six H2 molecules on each nanocluster. However, if the clusters preferentially assemble by joining their (100) facets (FIG. 4), then the hydrogen storage properties of the material are lost as these facets will no longer be able to reversibly reconstruct.

To predict the connection mechanism the nanoparticles will adopt, Applicants examine both the thermodynamics and kinetics of the assembly process. The connection of two nanoparticles is expected to proceed first by two H atoms detaching from the surface of each cluster forming an H2 molecule and leaving two dangling bonds. The dangling bonds on neighboring clusters then connect to form a new covalent bond between the clusters.

Comparing the total energy of C5Si24H22 clusters where an H2 molecule has been removed from a (111) and (100) facet, Applicants find it is 0.5 eV more favorable to leave a dangling bond on a (111) facet than on a (100) facet. Therefore, thermodynamics suggest the C5Si24H22 clusters will connect as in FIG. 3.

To examine the kinetics of the processes required to connect clusters Applicants use the procedure to calculate the energy barrier for the removal of two H atoms from the surface to form an H2 molecule. This barrier is 2.1 to 2.5 eV depending on the facet. However, the energy barrier required for the migration of a H atom attached to surface Si atom to move to a neighboring Si atom with a dangling bond is only ~0.3 eV. Therefore, the formation of dangling bonds on the (111) facets of the cluster is favored after H2 is released. This configuration of dangling bonds will lead to the creation of cluster connections via (111) facets such as those in FIG. 3, which do not impede the storage of H2 on (100) dihydride/dimer facets.

The calculated value of $\mu C$ H for reconstructing surface dihydrides on two clusters connected by (111) facets (FIG. 3), $C10Si48H66 \rightarrow C10Si48H42$ corresponds to a T C of approximately 340 K, the same as a single C5Si24 cluster, i.e., the small structural changes introduced when two nanoparticles are connected by their (111) facets do not affect the relative energies of their SiH2 and SiH surface groups. Extending the structure further by joining 5 and 20 C5Si24 clusters to form a C25Si120 ring structure and a C100Si480 dodecahedron (see FIGS. 1 and 7) Applicants find that the dihydride to dimer reconstruction is still unchanged with a T C of approximately 340 K.

The arrangement of the (111) facets of X29 particles restricts their bonding configurations to tetrahedrally bonded structures in which rotation around a cluster-cluster connection is inhibited as this connection is formed by 3 X—X bonds as shown in FIG. 3. Given this restriction, extending the structure beyond the 20 cluster dodecahedron shown in FIG. 7 generates a structure similar to quasi-crystal of X29 particles. The hydrogen storage capabilities of the material will not be significantly affected by its long range order as the only requirement is for the majority of (100) facets to remain exposed, and any structure consisting of (111) facet connections will satisfy this criteria. However, it is tempting to note that these nanoparticles are predicted to form a structure with no long range order, yet a large (~3 eV) band gap.

Currently, the synthesis of large quantities of SiC4Si24H36 and C5Si24H36 is not as routine as synthesizing pure silicon clusters. Applicants hope that the potential applications of these material for hydrogen storage coupled with the interesting quasi three-dimensional crystal structures described here will stimulate the synthetic chemistry community to develop such synthesis techniques. Applicants note that the reduction of tetrachlorosilane is a standard growth method for pure Si clusters and suggest that a similar reduction approach might be used to generate these clusters. The core could be generated from the commercially available dimethyl propane or tetramethyl silane after halogenation of all the C—H bonds and the Si shells could be generated from partially halogenated disilanes.

Utilizing the dihydride/dimer reconstruction, the materials described above store 20 kg m–3 of H2, which is equivalent to storing H2 gas at ~10,000 psi pressure. This corresponds to 1.6 wt % H2 which is slightly higher than the 1.4 wt % achieved by LaNi5H6, currently one of the most promising metal hydride storage systems. If the nanoparticles can be heated more aggressively to remove all the hydrogen from the material, then in principle the hydrogen content increases to 3.2 wt %. These parameters are competitive with the most promising metal hydride materials developed to date. In addition, this new material is constructed from only carbon and silicon and is therefore both cheap and environmentally benign.

In addition to vehicular applications, another promising application of PEM fuel cells is in portable consumer electronic devices. In these devices the benchmark for energy storage is Lithium ion batteries. Hydrogen stored in the above nano-material and combined with oxygen in a PEM fuel cell has an energy density of 4.3 MJ kg-1. This is approximately an order of magnitude higher than Li batteries (0.5 MJ kg-1), while the two media have similar weights and volumes.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for hydrogen storage, comprising:
a porous nano-structured material, wherein said porous nano-structured material comprises a 1 nm particle of 29 Si atoms with 100 facets containing SiH2 dihydride groups and reconstructed SiH dimer groups, and
hydrogen absorbed on the surfaces of said porous nano-structured material.

2. An apparatus for hydrogen storage, comprising:
a porous nano-structured material, wherein said porous nano-structured material comprises a hybrid nanoparticle $Si_{29}H_{36}$, and
hydrogen absorbed on the surfaces of said porous nano-structured material.

3. An apparatus for hydrogen storage, comprising:
a porous nano-structured material, wherein said porous nano-structured material comprises a hybrid nanoparticle $Si_{29}H_{24}$, and
hydrogen absorbed on the surfaces of said porous nano-structured material.

4. An apparatus for hydrogen storage, comprising:
a porous nano-structured material, wherein said porous nano-structured material comprises a hybrid nanoparticle $C_{10}Si_{48}H_{42}$ joined by 111 facets, and
hydrogen absorbed on the surfaces of said porous nano-structured material.

5. An apparatus for hydrogen storage, comprising:
a porous nano-structured material, wherein said porous nano-structured material comprises a hybrid nanoparticle $C_{10}Si_{48}H_{46}$ joined by 100 facets, and
hydrogen absorbed on the surfaces of said porous nano-structured material.

6. An apparatus for hydrogen storage of, comprising:
a porous nano-structured material, wherein said porous nano-structured material comprises a hybrid nanoparticle $C_{10}Si_{48}H_{46}$ joined by a single bond, and
hydrogen absorbed on the surfaces of said porous nano-structured material.

7. An apparatus for hydrogen storage, comprising:
a porous nano-structured material, wherein said porous nano-structured material comprises a hybrid nanoparticle $C_{25}Si_{120}H_{90}$, and
hydrogen absorbed on the surfaces of said porous nano-structured material.

8. An apparatus for hydrogen storage, comprising:
a porous nano-structured material, wherein said porous nano-structured material comprises a hybrid nanoparticle $C_{100}Si_{430}H_{300}$, and
hydrogen absorbed on the surfaces of said porous nano-structured material.

9. A method of hydrogen storage, comprising the steps of:
absorbing hydrogen on the surfaces of a porous nano-structured semiconductor material, wherein said porous nano-structured material comprises a 1 nm particle of 29 Si atoms with 100 facets containing SiH2 dihydride groups and reconstructed SiH dimer groups.

10. A method of hydrogen storage, comprising the steps of:
absorbing hydrogen on the surfaces of a porous nano-structured semiconductor material, wherein said porous nano-structured material comprises a hybrid nanoparticle $Si_{29}H_{36}$.

11. A method of hydrogen storage, comprising the steps of:
absorbing hydrogen on the surfaces of a porous nano-structured semiconductor material, wherein said porous nano-structured material comprises a hybrid nanoparticle $Si_{29}H_{24}$.

12. A method of hydrogen storage, comprising the steps of:
absorbing hydrogen on the surfaces of a porous nano-structured semiconductor material, wherein said porous nano-structured material comprises a hybrid nanoparticle $C_{10}Si_{48}H_{42}$ joined by 111 facets.

13. A method of hydrogen storage, comprising the steps of:
absorbing hydrogen on the surfaces of a porous nano-structured semiconductor material, wherein said porous nano-structured material comprises a hybrid nanoparticle $C_{10}Si_{48}H_{46}$ joined by 100 facets.

14. A method of hydrogen storage, comprising the steps of:
absorbing hydrogen on the surfaces of a porous nano-structured semiconductor material, wherein said porous nano-structured material comprises a hybrid nanoparticle $C_{10}Si_{48}H_{46}$ joined by a single bond.

15. A method of hydrogen storage, comprising the steps of:
absorbing hydrogen on the surfaces of a porous nano-structured semiconductor material, wherein said porous nano-structured material comprises a hybrid nanoparticle $C_{25}Si_{120}H_{90}$.

16. A method of hydrogen storage, comprising the steps of:
absorbing hydrogen on the surfaces of a porous nano-structured semiconductor material, wherein said porous nano-structured material comprises a hybrid nanoparticle $C_{100}Si_{430}H_{300}$.

* * * * *